US012399902B2

(12) United States Patent
Takahashi et al.

(10) Patent No.: US 12,399,902 B2
(45) Date of Patent: Aug. 26, 2025

(54) INFORMATION DISPLAY APPARATUS, INFORMATION DISPLAY METHOD, AND COMPUTER-READABLE RECORDING MEDIUM STORING INFORMATION DISPLAY PROGRAM

(71) Applicant: Fujitsu Limited, Kawasaki (JP)

(72) Inventors: Jun Takahashi, Kawasaki (JP);
Mingxie Zheng, Kawasaki (JP);
Toshiyuki Yoshitake, Kawasaki (JP);
Kazuaki Nimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/334,796

(22) Filed: Jun. 14, 2023

(65) Prior Publication Data

US 2024/0104109 A1 Mar. 28, 2024

(30) Foreign Application Priority Data

Sep. 27, 2022 (JP) .................................. 2022-153332

(51) Int. Cl.
*G06F 16/00* (2019.01)
*G06F 16/248* (2019.01)
*G06F 16/951* (2019.01)

(52) U.S. Cl.
CPC .......... *G06F 16/248* (2019.01); *G06F 16/951* (2019.01)

(58) Field of Classification Search
CPC ............................. G06F 16/248; G06F 21/64

(Continued)

(56) References Cited

U.S. PATENT DOCUMENTS 9,582,763 B2 2/2017 Myslinski
10,872,100 B1 12/2020 Shefferman et al.
(Continued)

FOREIGN PATENT DOCUMENTS

JP 2017-162050 A 9/2017
JP 2020-508518 A 3/2020
(Continued)

OTHER PUBLICATIONS

Miriam J. Metzger et al., "Making Sense of Credibility on the Web: Models for Evaluating Online Information and Recommendations for Future Research", Journal of the American Society for Information Science and Technology., vol. 58, No. 13, Sep. 21, 2007, pp. 2078-2091, XP093129531.
(Continued)

*Primary Examiner* — Michelle N Owyang
(74) *Attorney, Agent, or Firm* — Fujitsu Intellectual Property Center

(57) ABSTRACT

An information display apparatus including: a memory; and a processor coupled to the memory, the processor being configured to perform processing including: analyzing transmission information to extract first analysis information with respect to the transmission information; acquiring, from among a plurality of pieces of second analysis information, second analysis information similar to the first analysis information, the plurality of pieces of second analysis information being obtained by analyzing a plurality of pieces of reliable information; comparing the first analysis information with the acquired second analysis information similar to the first analysis information; and displaying a result of the comparison and the transmission information.

8 Claims, 13 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 11,734,262 B2* | 8/2023 | Lintilhac | G06F 16/2379 |
| | | | 707/703 |
| 2002/0198866 A1 | 12/2002 | Kraft et al. | |
| 2015/0208245 A1* | 7/2015 | Robinton | H04L 9/3247 |
| | | | 455/411 |
| 2017/0199936 A1* | 7/2017 | Steelberg | G06F 16/9535 |
| 2017/0242865 A1* | 8/2017 | Maita | G06F 16/951 |
| 2017/0262754 A1 | 9/2017 | Mizuno et al. | |
| 2018/0210821 A1* | 7/2018 | Raghavan | G06F 11/3684 |
| 2019/0349204 A1* | 11/2019 | Enke | H04L 9/3247 |

FOREIGN PATENT DOCUMENTS

| | | |
|---|---|---|
| WO | 2012/008503 A1 | 1/2012 |
| WO | 2018/156641 A1 | 8/2018 |

OTHER PUBLICATIONS

Matthias Quasthoff et al., "Who Reads and Writes the Social Web? A Security Architecture for Web 2.0 Applications", Internet and Web Applications and Services, 2008. ICIW '08. Third International Conference on, IEEE, Piscataway, NY, USA, Jun. 8, 2009, pp. 576-582, XP031274360.
EESR—Extended European Search Report dated Feb. 28, 2024 for corresponding European Patent Application No. 23179212.8.

* cited by examiner

FIG. 2

| URL | DOMAIN |
|---|---|
| https://www.river.zzzz.go.jp/ | WEATHER INFORMATION |
| https://www.jartic.bbbbb.ro.jp/ | TRAFFIC INFORMATION |
| https://www.jma.go.ffffff.jp/bosai/ | EARTHQUAKE INFORMATION |
| ... | ... |

FIG. 3

| URL | AVAILABILITY OF PUBLIC KEY | DOMAIN |
|---|---|---|
| https://www.data1.com | AVAILABLE | WEATHER INFORMATION |
| https://www.data2.com | AVAILABLE | TRAFFIC INFORMATION |
| ... | ... | ... |

FIG. 5

| DOMAIN | ASSOCIATED KEYWORDS |
|---|---|
| WEATHER INFORMATION | RIVER, FLOOD, OVERFLOW, HEAVY RAIN, ... |
| ROAD TRAFFIC INFORMATION | ACCIDENT, TRAFFIC JAM, INTERCHANGE NAME, ... |
| EARTHQUAKE INFORMATION | SEISMIC INTENSITY, SHAKING, BLACKOUT, ... |
| ... | ... |

FIG. 6

| DOMAIN | SEARCH CONDITION | | |
|---|---|---|---|
| | TIME SEARCH CONDITION | LOCATION SEARCH CONDITION | ANOTHER SEARCH CONDITION |
| WEATHER INFORMATION | ERROR OF ONE DAY | SAME MUNICIPALITY | TEXTS ARE SIMILAR |
| ROAD TRAFFIC INFORMATION | ERROR OF ONE HOUR | SAME AREA | - |
| EARTHQUAKE INFORMATION | ERROR OF ONE MONTH | SAME REGION | - |
| ... | ... | ... | ... |

INFORMATION DISPLAY APPARATUS, INFORMATION DISPLAY METHOD, AND COMPUTER-READABLE RECORDING MEDIUM STORING INFORMATION DISPLAY PROGRAM

CROSS-REFERENCE TO RELATED APPLICATION

This application is based upon and claims the benefit of priority of the prior Japanese Patent Application No. 2022-153332, filed on Sep. 27, 2022, the entire contents of which are incorporated herein by reference.

FIELD

The embodiments discussed herein are related to an information display apparatus and the like.

BACKGROUND

With spread of smartphones and social networking services (SNSs), individuals, organizations, and the like may transmit information to the world anytime and anywhere via the Internet.

On the other hand, many pieces of information that may be acquired via the Internet may not be easily confirmed by a viewer as to whether content of the acquired information is true or false, and erroneous information may be spread. Furthermore, when a plurality of viewers misunderstands the content of the information, social or economic confusion may be induced.

Thus, there is a demand for a mechanism capable of presenting information with which a viewer may confirm reliability of information with respect to the information acquired via the Internet.

For example, there is the following existing technology as a technology for evaluating reliability of information. In the existing technology, reliability of news content is calculated by using current scores set for associated media outlets, associated journalists, and associated predetermined topics for the news content.

Japanese Laid-open Patent Publication No. 2017-162050 and Japanese National Publication of International Patent Application No. 2020-508518 are disclosed as related art.

SUMMARY

According to an aspect of the embodiments, there is provided an information display apparatus including: a memory; and a processor coupled to the memory, the processor being configured to perform processing including: analyzing transmission information to extract first analysis information with respect to the transmission information; acquiring, from among a plurality of pieces of second analysis information, second analysis information similar to the first analysis information, the plurality of pieces of second analysis information being obtained by analyzing a plurality of pieces of reliable information; comparing the first analysis information with the acquired second analysis information similar to the first analysis information; and displaying a result of the comparison and the transmission information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a data structure of a white list table;

FIG. 3 is a diagram illustrating an example of a data structure of a public key table;

FIG. 5 is a diagram illustrating an example of a data structure of a domain table;

FIG. 6 is a diagram illustrating an example of a data structure of a search condition table;

DESCRIPTION OF EMBODIMENTS

However, in the existing technology described above, there is a problem that information for determining reliability of transmitted information may not be presented.

For example, in the existing technology described above, it is possible to calculate a reliability score for information transmitted from a person, an organization, or the like whose identity is known to some extent, such as a media publishing station, but it is difficult to apply the reliability score to information transmitted from an ordinary individual or anonymously through an SNS.

In one aspect, an object of an embodiment is to provide an information display apparatus, an information display method, and an information display program capable of presenting information for determining reliability of transmitted information.

Hereinafter, embodiments of an information display apparatus, an information display method, and an information display program disclosed in the present application will be described in detail with reference to the drawings. Note that the present disclosure is not limited by the embodiments.

EMBODIMENTS

An information display apparatus according to the present embodiment will be described. The information display apparatus acquires reliable information and analyzes the reliable information in advance. When transmission information transmitted by an anonymous user is acquired, the information display apparatus analyzes the transmission information. The information display apparatus acquires reliable information corresponding to an analysis result similar to an analysis result of the transmission information, and displays a difference portion between the acquired reliable information and the transmission information together with the transmission information. With this configuration, it is possible to present information for determining reliability of transmitted information.

Figure 1:
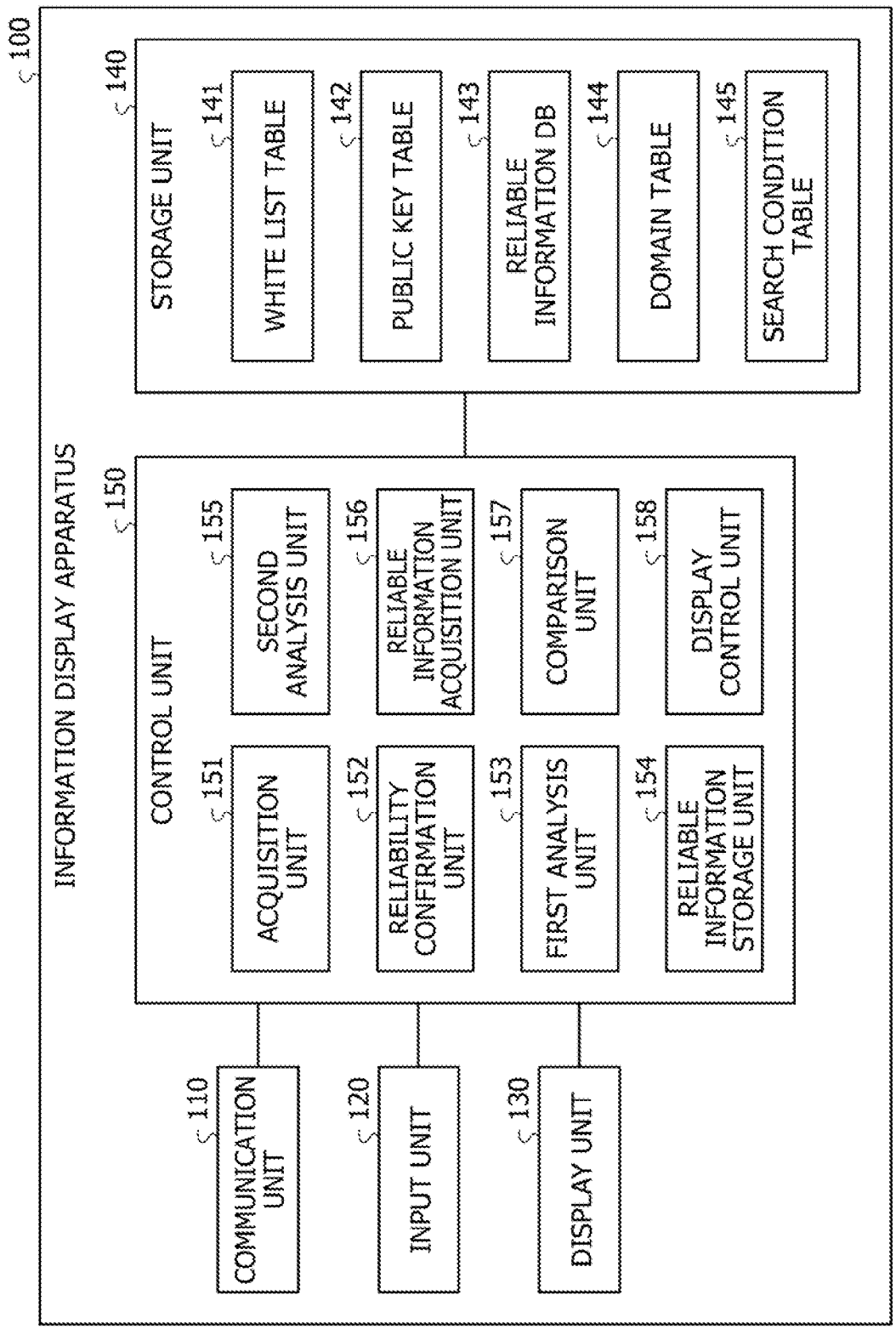
FIG. 1 is a diagram illustrating a configuration example of an information display apparatus according to the present embodiment.

Subsequently, the information display apparatus according to the present embodiment will be specifically described. FIG. 1 is a diagram illustrating a configuration example of the information display apparatus according to the present embodiment. As illustrated in FIG. 1, the information display apparatus 100 includes a communication unit 110, an input unit 120, a display unit 130, a storage unit 140, and a control unit 150.

The communication unit 110 executes data communication with a server in a network, another external device, or the like. The control unit 150 to be described later exchanges data with the server or the another external device via the communication unit 110.

The input unit 120 is an input device that inputs various types of information to the control unit 150 of the information display apparatus 100. The input unit 120 is a keyboard, a mouse, a touch panel, or the like.

The display unit 130 is a display device that displays information output from the control unit 150.

The storage unit 140 includes a white list table 141, a public key table 142, a reliable information database (DB) 143, a domain table 144, and a search condition table 145. The storage unit 140 corresponds to a semiconductor memory element such as a random access memory (RAM) or a flash memory, or a storage device such as a hard disk drive (HDD).

The white list table 141 is a table in which a location of reliable information is registered in advance. FIG. 2 is a diagram illustrating an example of a data structure of the white list table. As illustrated in FIG. 2, the white list table 141 associates a uniform resource locator (URL) with a domain.

The URL of the white list table 141 indicates a location of reliable information. The domain indicates a domain (genre) of information existing in the URL. For example, FIG. 2 indicates that a domain of information (reliable information) of a URL "https://www.river.zzzz.go.jp/" is "weather information".

The public key table 142 is a table indicating availability of a public key for each piece of information with a digital signature. FIG. 3 is a diagram illustrating an example of a data structure of the public key table. As illustrated in FIG. 3, the public key table 142 associates a URL, availability of a public key, and a domain.

The URL of the public key table 142 indicates a location of information with a digital signature. The availability of a public key indicates whether or not a public key of the corresponding information with a digital signature is in a situation where it may be acquired. In a case where the availability of a public key is "available", the public key is in a situation where it may be acquired. In a case where the availability of a public key is "unavailable", the public key is not in a situation where it may be acquired. The domain indicates a domain (genre) of information existing in the URL.

For example, FIG. 3 indicates that availability of a public key of information of a URL "https://www.data1.com" (information with a digital signature) is "available" and a domain is "weather information".

Figure 4:
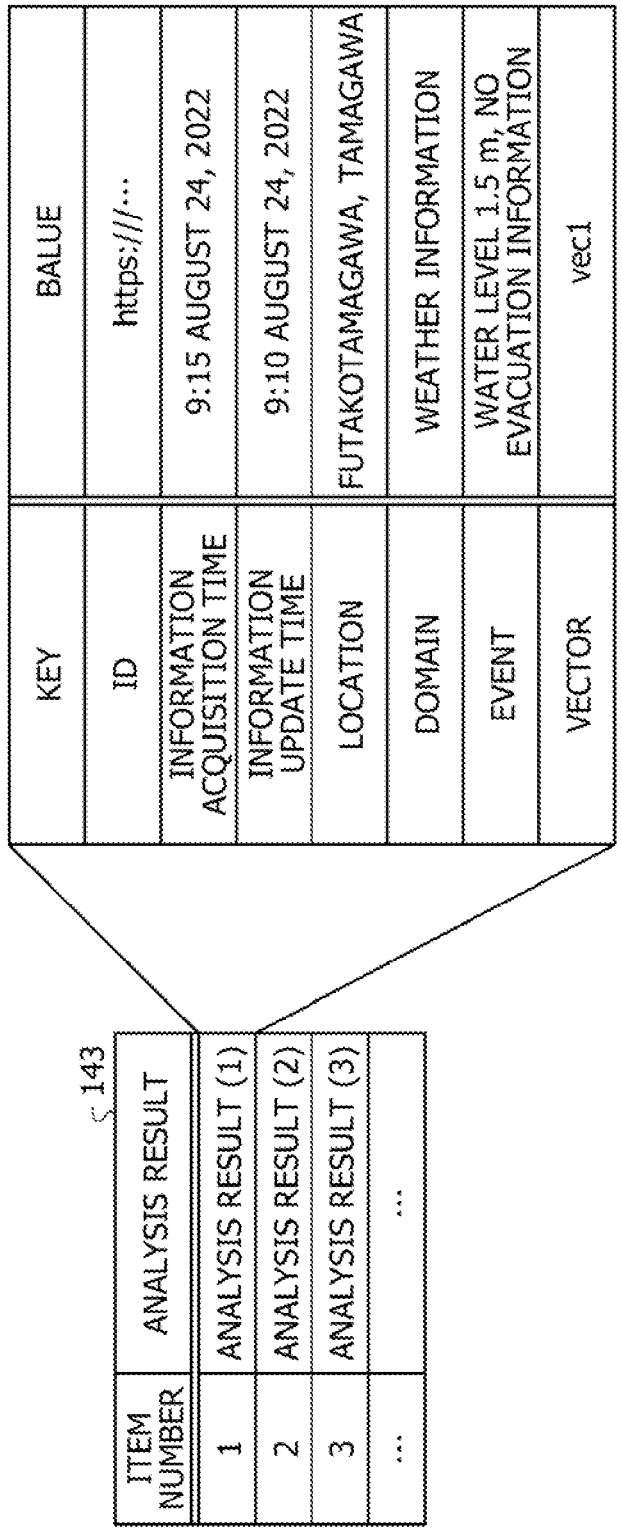
FIG. 4 is a diagram illustrating an example of a data structure of a reliable information database (DB)

The reliable information DB 143 holds an analysis result of reliable information. FIG. 4 is a diagram illustrating an example of a data structure of the reliable information DB. As illustrated in FIG. 4, the reliable information DB 143 associates an item number with an analysis result. For example, one analysis result is registered for one piece of reliable information. A Key and a Value are set in each analysis result.

As an example, a data structure of an analysis result (1) is indicated. In the Key, an identifier (ID), an information acquisition time, an information update time, a location, a domain, an event, and a vector are set. In the Value for the Key "ID", a URL of information to be analyzed (reliable information) is set. In the Value for the Key "information acquisition time", a time when the information to be analyzed is acquired is set. In the Value for the Key "information update time", an update time of the information to be analyzed is set.

In the Value for the Key "location", a keyword related to a location extracted from a text included in the information to be analyzed (reliable information) is set. In the Value for the Key "event", a keyword related to an event extracted from a text included in the information to be analyzed (reliable information) is set. In the Value for the Key "vector", an average value of vectors of the respective words included in a text included in the information to be analyzed (reliable information) is set. The vectors of the respective words are calculated by using a deep learning model or the like subjected to training using an appearance frequency, order, similarity, and the like of the respective words.

The domain table 144 is used in a case where a domain to which information belongs is determined. FIG. 5 is a diagram illustrating an example of a data structure of the domain table. As illustrated in FIG. 5, the domain table 144 associates a domain with associated keywords. In a case where any of the associated keywords is included in a text of certain information, a domain corresponding to the associated keyword is allocated. For example, in a case where a text of certain information includes "river", a domain of such information is "weather information".

The search condition table 145 is a table in which a search condition in a case where reliable information similar to an analysis result of transmission information is searched for is set. FIG. 6 is a diagram illustrating an example of a data structure of the search condition table. As illustrated in FIG. 6, the search condition table 145 associates a domain with a search condition. The search condition includes a time search condition, a location search condition, and another search condition. The domain indicates a domain of information to be searched for.

The time search condition is a search condition related to a time. For example, in a case where the time search condition is "error of one day", it is indicated that a plurality of pieces of reliable information is searched for reliable information in which an error between an information acquisition time of transmission information and an information acquisition time of the reliable information is within one day.

The location search condition is a search condition related to a location. For example, in a case where the location search condition is "same municipality", it is indicated that a plurality of pieces of reliable information is searched for reliable information in which a location of transmission information and a location of the reliable information are the same municipality.

The another search condition is an another search condition. For example, in a case where the another search condition is "texts are similar", it is indicated that a plurality of pieces of reliable information is searched for reliable information in which a text of transmission information and a text of the reliable information are similar. For example, it is assumed that, in a case where cosine similarity between a vector of transmission information and a vector of reliable information is equal to or greater than a threshold, a text of the transmission information and a text of the reliable information are similar.

For example, in a case where a domain of transmission information is "weather information" and reliable information similar to such transmission information is searched for, a domain of the reliable information to be searched for is limited to "weather information". Furthermore, determination as to whether or not there is similarity to the transmission information with the domain "weather information" is executed based on the time search condition "error of one day", the location search condition "same municipality", and the another search condition "texts are similar".

The description returns to FIG. 1. The control unit 150 includes an acquisition unit 151, a reliability confirmation unit 152, a first analysis unit 153, and a reliable information storage unit 154. The control unit 150 includes a second analysis unit 155, a reliable information acquisition unit 156, a comparison unit 157, and a display control unit 158. The control unit 150 is implemented by a central processing unit (CPU), a graphics processing unit (GPU), a hard-wired logic such as an application specific integrated circuit (ASIC) or a field programmable gate array (FPGA), or the like.

The acquisition unit 151 acquires information from the Internet by crawling or the like. In the following description, the information acquired by the acquisition unit 151 is referred to as "acquisition information". The acquisition unit 151 sets, in the acquisition information, a URL as an acquisition source of the acquisition information, and outputs the acquisition information to the reliability confirmation unit 152.

The reliability confirmation unit 152 determines whether or not acquisition information is reliable information. For example, in a case where a URL set in the acquisition information matches a URL in the white list table 141, the reliability confirmation unit 152 determines that the acquisition information is the reliable information. Furthermore, the reliability confirmation unit 152 specifies a domain corresponding to the URL based on the white list table 141, and associates the specified domain with the reliable information.

In a case where the URL set in the acquisition information does not match the URL in the white list table 141, the reliability confirmation unit 152 determines whether or not a digital signature is added to the acquisition information. When the digital signature is added to the acquisition information, the reliability confirmation unit 152 refers to the public key table 142, and determines that the acquisition information is the reliable information in a case where availability of a public key corresponding to the URL of the acquisition information is "available". Furthermore, the reliability confirmation unit 152 specifies a domain corresponding to the URL based on the public key table 142, and associates the specified domain with the reliable information.

The reliability confirmation unit 152 outputs the reliable information to the first analysis unit 153. In the following description, the reliable information in the acquisition information is simply referred to as "reliable information".

The first analysis unit 153 generates an analysis result by analyzing reliable information. The analysis result includes the Value for each Key described with reference to FIG. 4. The first analysis unit 153 outputs the analysis result of the reliable information to the reliable information storage unit 154.

For example, the first analysis unit 153 executes parsing on the reliable information, and acquires an element corresponding to "Key, Value" among the respective elements of the reliable information (HyperText Markup Language (HTML)/Extensible Markup Language (XML)/JavaScript Object Notation (JSON)). The first analysis unit 153 executes syntax analysis for a text of the element that is "Key, Value", extracts an information acquisition time, an information update time, a location, a domain, and an event, and sets them in the analysis result. Note that the first analysis unit 153 may use a domain associated with the reliable information (domain set in the reliability confirmation unit 152) as the Value corresponding to the Key "domain".

The first analysis unit 153 specifies vectors of a plurality of words included in the text of the element that is "Key, Value", and calculates an average value of the vectors of the respective words. For example, the first analysis unit 153 may specify the vectors of the respective words included in the text based on dictionary information in which words and vectors of the words are associated. Furthermore, the first analysis unit 153 sets a URL set in the reliable information to the Value corresponding to the Key "ID" of the analysis result.

The first analysis unit 153 repeatedly executes the processing described above for each piece of the reliable information acquired from the reliability confirmation unit 152, generates each analysis result, and outputs the analysis result to the reliable information storage unit 154.

The reliable information storage unit 154 stores each analysis result acquired from the first analysis unit 153 in the reliable information DB 143.

The second analysis unit 155 acquires transmission information transmitted through a social networking service (SNS) or the like, which is transmission information for determining reliability. A user may operate the input unit 120 to specify the transmission information to be acquired. The first analysis unit 153 generates an analysis result by analyzing the transmission information. The analysis result includes the Value for each Key described with reference to FIG. 4. The second analysis unit 155 outputs the analysis result of the transmission information to the reliable information acquisition unit 156.

For example, the second analysis unit 155 executes parsing on the transmission information, and acquires an element corresponding to "Key, Value" among the respective elements of the transmission information (HTML/XML/JSON). In a case where the transmission information includes an image, the second analysis unit 155 may perform person detection based on the image.

The second analysis unit 155 executes syntax analysis for a text of the element that is "Key, Value", extracts an information acquisition time, an information update time, a location, and an event, and sets them in the analysis result.

The second analysis unit 155 specifies vectors of a plurality of words included in the text of the element that is "Key, Value", and calculates an average value of the vectors of the respective words. For example, the second analysis unit 155 may specify the vectors of the respective words included in the text based on the dictionary information in which words and vectors of the words are associated. Furthermore, the second analysis unit 155 sets a URL as an acquisition source of the transmission information to the Value corresponding to the Key "ID" of the analysis result.

The second analysis unit 155 compares the words of the text of the element that is "Key, Value" of the transmission information with the associated keywords of the domain table 144, specifies a domain of the transmission information, and sets the domain in the analysis result.

The reliable information acquisition unit 156 searches the reliable information DB 143 for an analysis result (analysis result of reliable information) similar to an analysis result of transmission information, and outputs the analysis result of the transmission information and the analysis result searched for to the comparison unit 157. Hereinafter, processing of the reliable information acquisition unit 156 will be specifically described. Hereinafter, for convenience of description, an analysis result of transmission information is referred to as a "first analysis result", and an analysis result of reliable information is referred to as a "second analysis result".

The reliable information acquisition unit 156 specifies a search condition corresponding to the domain based on the domain set in the first analysis result and the search condition table 145. For example, when it is assumed that the domain of the first analysis result is "weather information", the time search condition is "error of one day", the location search condition is "same municipality", and the another search condition is "texts are similar".

The reliable information acquisition unit 156 searches for a second analysis result whose domain is the same as the domain of the first analysis result and that satisfies all of the time search condition, the location search condition, and the another search condition as a second analysis result similar to the first analysis result. Note that setting may be performed on the reliable information acquisition unit 156 so that it is determined that the second analysis result is similar to the first analysis result when a part of the search conditions is satisfied.

Processing of determining whether or not the "time search condition" is satisfied by the reliable information acquisition unit 156 will be described. Here, description will be made assuming that the time search condition is "error of one day". In a case where a difference between the Value of the Key "information update time" of the first analysis result and the Value of the Key "information update time" of the second analysis result is less than one day (24 hours), the reliable information acquisition unit 156 determines that the second analysis result satisfies the time search condition.

Processing of determining whether or not the "location search condition" is satisfied by the reliable information acquisition unit 156 will be described. Here, description will be made assuming that the location search condition is "same municipality". In a case where the Value of the Key "location" of the first analysis result and the Value of the Key "location" of the second analysis result are included in the same municipality, the reliable information acquisition unit 156 determines that the second analysis result satisfies the location search condition. The reliable information acquisition unit 156 may determine whether or not the Value of the Key "location" of the first analysis result and the Value of the Key "location" of the second analysis result are included in the same municipality by using map information or the like in which regions of municipalities and names of locations are set.

Processing of determining whether or not the "another search condition" is satisfied by the reliable information acquisition unit 156 will be described. Here, description will be made assuming that the another search condition is "texts are similar". In a case where cosine similarity between the Value of the Key "vector" of the first analysis result and the Value of the Key "vector" of the second analysis result is calculated and the cosine similarity is equal to or greater than a threshold, the reliable information acquisition unit 156 determines that the second analysis result satisfies the another search condition.

The reliable information acquisition unit 156 outputs the transmission information, the first analysis result, and a search result to the comparison unit 157. The search result includes the second analysis result determined to be similar to the first analysis result.

On the other hand, in a case where there is no second analysis result similar to the first analysis result, the reliable information acquisition unit 156 outputs the fact that there is no second analysis result similar to the first analysis result and the transmission information to the display control unit 158.

The comparison unit 157 compares a first analysis result with a second analysis result included in a search result, and determines whether or not there is a difference portion between the first analysis result and the second analysis result. For example, the comparison unit 157 compares the Values of the Key (for example, event) other than the Key used in a case where the reliable information acquisition unit 156 described above determines whether or not the "time search condition", the "location search condition", and the "another search condition" are satisfied.

The comparison unit will be described assuming that the Value of the Key "event" of the first analysis result is "likely to overflow" and the Value of the Key "event" of the second analysis result included in the search result is "water level 1.5 m, no evacuation information". For example, the Value "likely to overflow" of the Key "event" of the first analysis result is referred to as a first event text, and the Value "water level 1.5 m, no evacuation information" of the Key "event" of the second analysis result included in the search result is referred to as a second event text.

The comparison unit 157 executes morphological analysis on the first event text and the second event text, and divides the first event text and the second event text into morphemes. The comparison unit 157 compares each morpheme of the first event text with each morpheme of the second event text. The comparison unit 157 specifies, as a difference portion, each morpheme that does not match each morpheme of the second event text among the respective morphemes of the first event text. For example, a difference portion based on a comparison result between the Value "likely to overflow" of the Key "event" of the first analysis result and the Value "water level 1.5 m, no evacuation information" of the Key "event" of the second analysis result included in the search result is "likely to overflow".

The comparison unit 157 executes the processing described above, and in a case where there is no difference portion, outputs the transmission information and first comparison result information to the display control unit 158. For example, a URL of the second analysis result is set in the first comparison result information.

On the other hand, in a case where there is a difference portion, the comparison unit 157 outputs the transmission information and second comparison result information to the display control unit 158. For example, the difference portion and the URL of the second analysis result are set in the second comparison result information.

Figure 7:
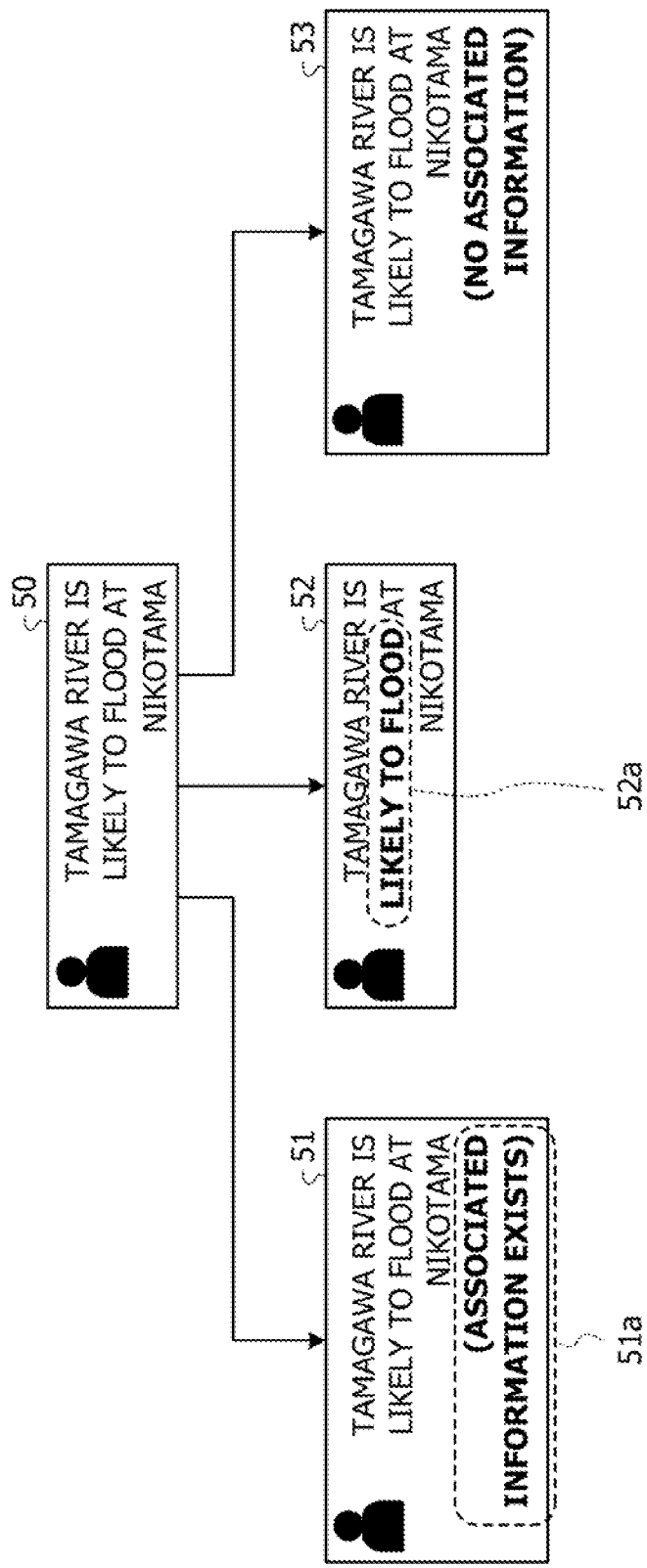
FIG. 7 is a diagram for describing processing of a display control unit.

The display control unit 158 causes the display unit 130 to display transmission information and a difference portion in association with each other. FIG. 7 is a diagram for describing processing of the display control unit. In FIG. 7, original transmission information (text of the transmission information) is set as display information 50.

When acquiring first comparison result information from the comparison unit 157, the display control unit 158 causes the display unit 130 to display display information 51. In the display information 51, an icon 51a of "associated information exists" is displayed together with a location of transmission information and a text of an event. When the icon 51a is selected, the display control unit 158 causes a URL of a second analysis result set in the first comparison result information and a text of the second analysis result to be displayed.

When second comparison result information is acquired from the comparison unit 157, the display control unit 158 causes the display unit 130 to display display information 52. In the display information 52, a difference portion between the location of the transmission information and the text of the event is highlighted. In a case where the highlighted difference portion is selected by a user, the display control unit 158 may cause the URL of the second analysis result and the text of the second analysis result to be displayed together.

When the fact that there is no second analysis result similar to the first analysis result and the transmission information are acquired from the reliable information acquisition unit 156, the display control unit 158 causes the display unit 130 to display display information 53. The display control unit 158 may cause the fact that there is no associated information to be displayed together with the display information 53.

Figure 8:
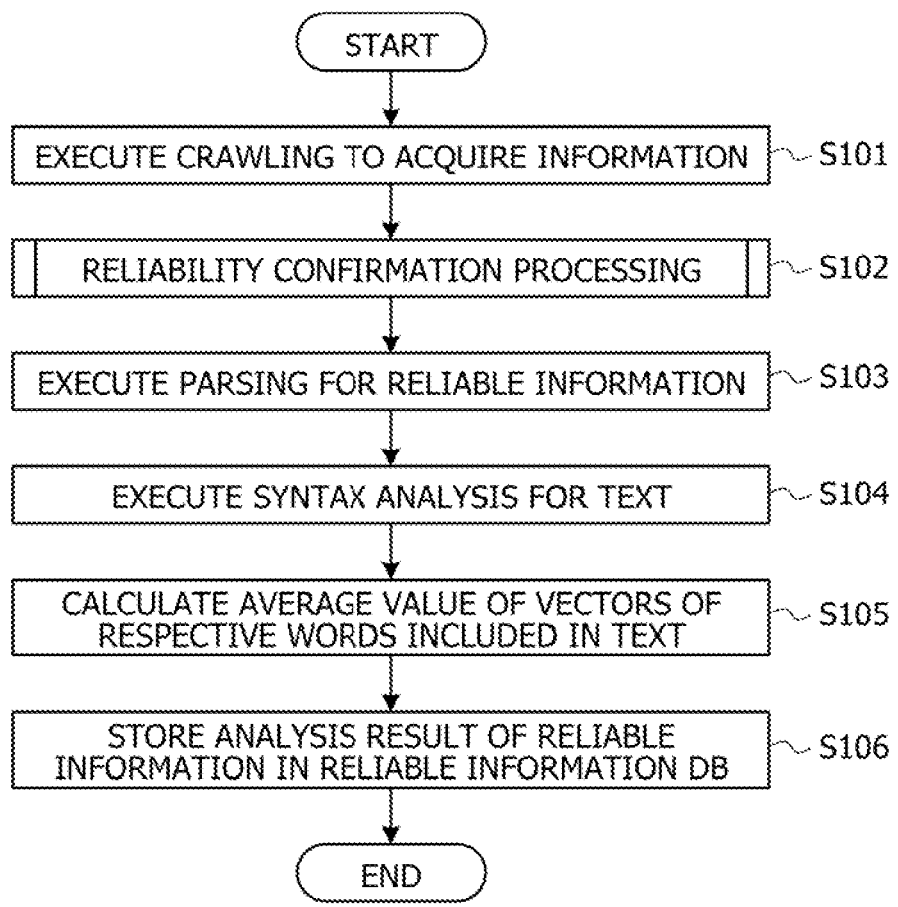
FIG. 8 is a flowchart (1) illustrating a processing procedure of the information display apparatus according to the present embodiment.

Next, an example of a processing procedure of the information display apparatus 100 according to the present embodiment will be described. FIG. 8 is a flowchart (1) illustrating the processing procedure of the information display apparatus according to the present embodiment. As illustrated in FIG. 8, the acquisition unit 151 of the information display apparatus 100 executes crawling to acquire information (Step S101). The reliability confirmation unit 152 of the information display apparatus 100 executes reliability confirmation processing (Step S102).

The first analysis unit 153 of the information display apparatus 100 executes parsing for reliable information (Step S103). The first analysis unit 153 executes syntax analysis for a text (Step S104). The first analysis unit 153 calculates an average value of vectors of the respective words included in the text (Step S105).

The reliable information storage unit 154 of the information display apparatus 100 stores an analysis result of the reliable information in the reliable information DB 143 (Step S106).

Figure 9:
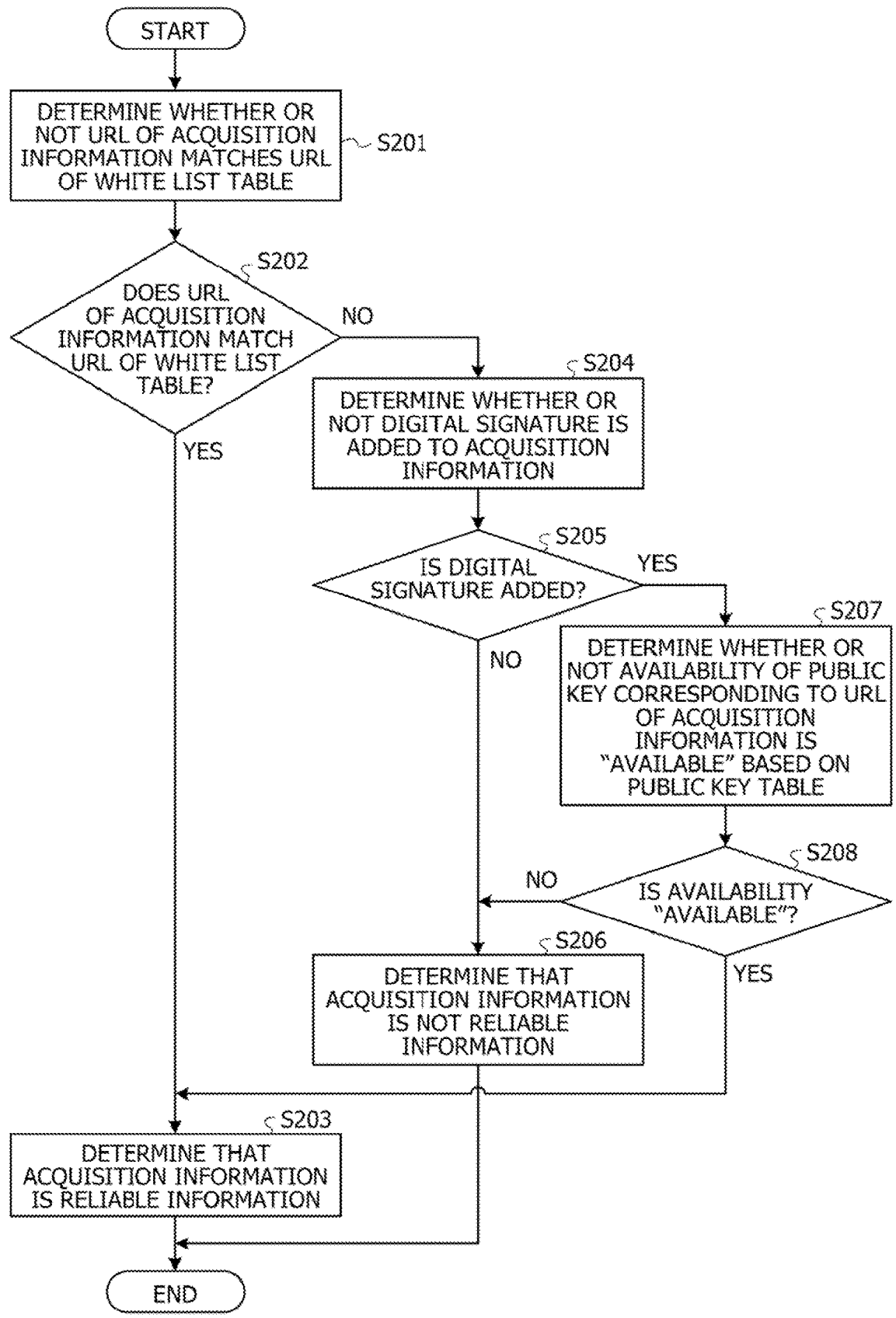
FIG. 9 is a flowchart illustrating a processing procedure of reliability confirmation processing.

Here, an example of a processing procedure of the reliability confirmation processing described in Step S102 in FIG. 8 will be described. FIG. 9 is a flowchart illustrating the processing procedure of the reliability confirmation processing. As illustrated in FIG. 9, the reliability confirmation unit 152 of the information display apparatus 100 determines whether or not a URL of the acquisition information matches a URL of the white list table 141 (Step S201).

In a case where the URL of the acquisition information matches the URL of the white list table 141 (Step S202, Yes), the reliability confirmation unit 152 determines that the acquisition information is reliable information (Step S203).

On the other hand, in a case where the URL of the acquisition information does not match the URL of the white list table 141 (Step S202, No), the reliability confirmation unit 152 determines whether or not a digital signature is added to the acquisition information (Step S204).

In a case where the digital signature is not added (Step S205, No), the reliability confirmation unit 152 determines that the acquisition information is not reliable information (Step S206).

On the other hand, in a case where the digital signature is added (Step S205, Yes), the reliability confirmation unit 152 determines whether or not availability of a public key corresponding to the URL of the acquisition information is "available" based on the public key table 142 (Step S207).

In a case where the availability is not "available" (Step S208, No), the reliability confirmation unit 152 proceeds to Step S206. On the other hand, in a case where the availability is "available" (Step S208, Yes), the reliability confirmation unit 152 proceeds to Step S203.

Figure 10:
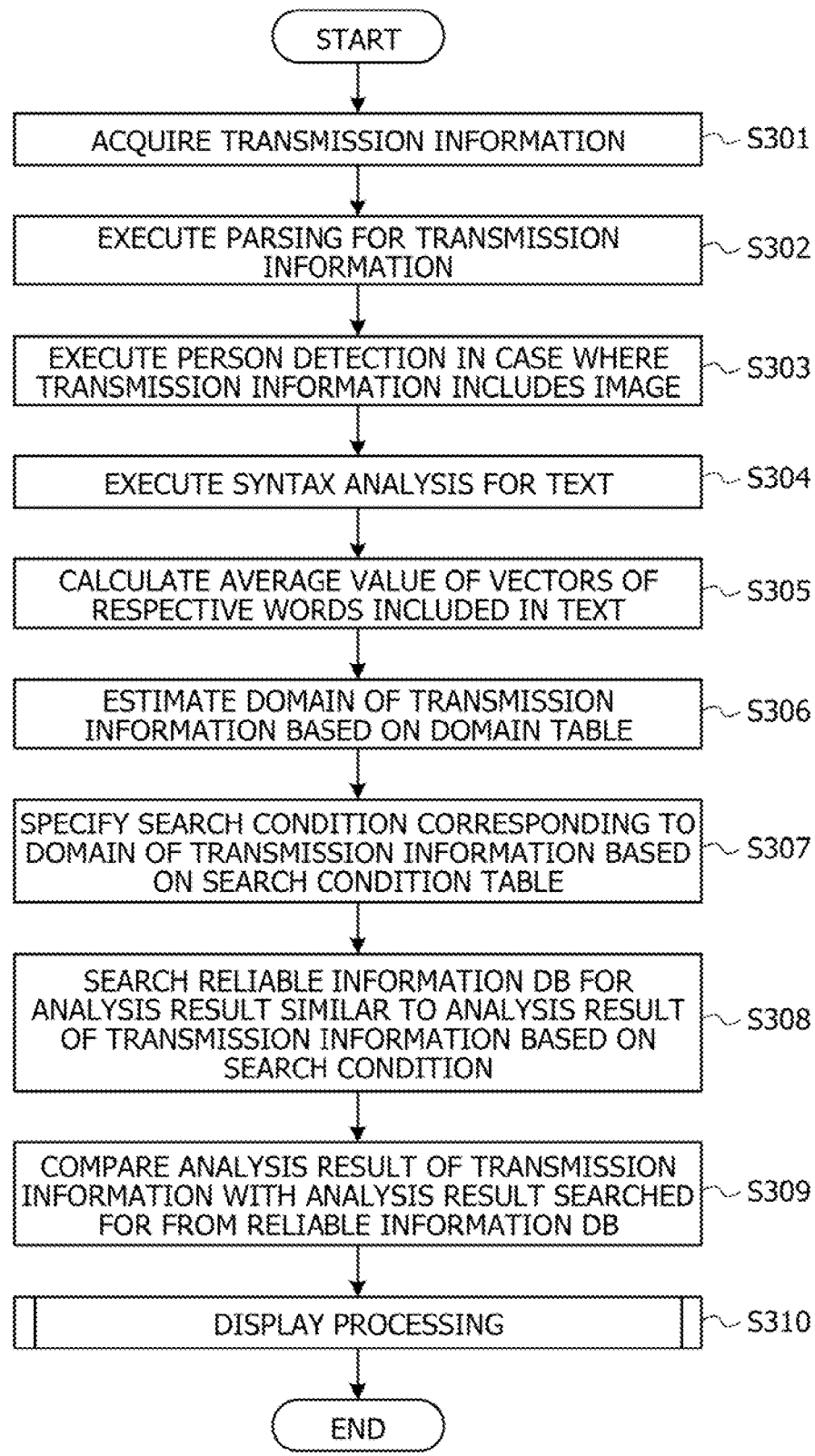
FIG. 10 is a flowchart (2) illustrating a processing procedure of the information display apparatus according to the present embodiment.

FIG. 10 is a flowchart (2) illustrating the processing procedure of the information display apparatus according to the present embodiment. The second analysis unit 155 of the information display apparatus 100 acquires transmission information (Step S301). The second analysis unit 155 executes parsing for the transmission information (Step S302).

The second analysis unit 155 executes person detection in a case where the transmission information includes an image (Step S303). The second analysis unit 155 executes syntax analysis for a text (Step S304). The second analysis unit 155 calculates an average value of vectors of the respective words included in the text (Step S305). The second analysis unit 155 estimates a domain of the transmission information based on the domain table 144 (Step S306).

The reliable information acquisition unit 156 specifies a search condition corresponding to the domain of the transmission information based on the search condition table 145 (Step S307). The reliable information acquisition unit 156 searches the reliable information DB 143 for an analysis result similar to an analysis result of the transmission information based on the search condition (Step S308).

The comparison unit 157 of the information display apparatus 100 compares the analysis result of the transmission information with the analysis result searched for from the reliable information DB 143 (Step S309). The display control unit 158 of the information display apparatus 100 executes display processing (Step S310).

Figure 11:
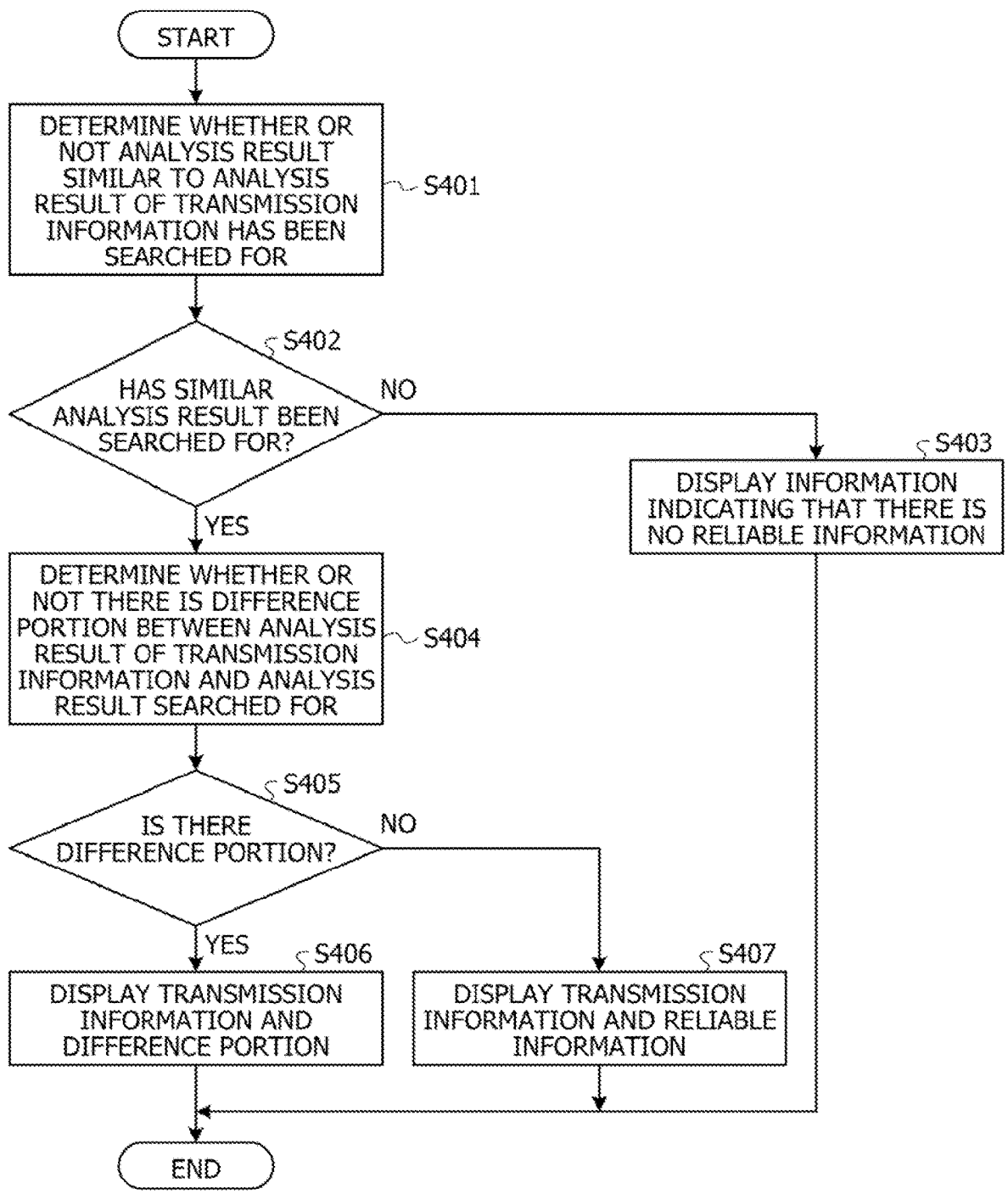
FIG. 11 is a flowchart illustrating a processing procedure of display processing.

Here, an example of a processing procedure of the display processing described in Step S310 in FIG. 10 will be described (Step S310). FIG. 11 is a flowchart illustrating the processing procedure of the display processing. As illustrated in FIG. 11, the display control unit 158 of the information display apparatus 100 determines whether or not the analysis result similar to the analysis result of the transmission information has been searched for (Step S401).

In a case where the similar analysis result has not been searched for (Step S402, No), the display control unit 158 causes the display unit 130 to display information indicating that there is no reliable information (Step S403). For example, in Step S403, the display control unit 158 causes the display unit 130 to display the display information 53 in FIG. 7.

On the other hand, in a case where the similar analysis result has been searched for (Step S402, Yes), the display control unit 158 determines whether or not there is a difference portion between the analysis result of the transmission information and the analysis result searched for (Step S404).

In a case where there is the difference portion between the analysis result of the transmission information and the analysis result searched for (Step S405, Yes), the display control unit 158 causes the display unit 130 to display the transmission information and the difference portion (Step S406). For example, in Step S406, the display control unit 158 causes the display unit 130 to display the display information 52 in FIG. 7.

In a case where there is no difference portion between the analysis result of the transmission information and the retrieved analysis result (Step S405, No), the display control unit 158 causes the display unit 130 to display the transmission information and reliable information (Step S407). For example, in Step S407, the display control unit 158 causes the display unit 130 to display the display information 51 in FIG. 7.

Next, effects of the information display apparatus 100 according to the present embodiment will be described. The information display apparatus 100 acquires reliable information and analyzes the reliable information in advance. When transmission information transmitted by an anonymous user is acquired, the information display apparatus 100 analyzes the transmission information. The information display apparatus 100 acquires reliable information corresponding to an analysis result similar to an analysis result of the transmission information, and displays a difference portion between the acquired reliable information and the transmission information together with the transmission information. With this configuration, it is possible to present information for determining reliability of the transmission information.

In a case where a URL of acquisition information is set in the white list table 141, the information display apparatus 100 determines that the acquisition information is the reliable information. Furthermore, in a case where a digital signature is added to acquisition information and a public key may be acquired, the information display apparatus 100 determines that the acquisition information is the reliable information. With this configuration, the reliable information may be appropriately acquired.

The information display apparatus 100 displays transmission information and a text of an analysis result of reliable information similar to an analysis result of the transmission information. With this configuration, it is possible to confirm a basis that the transmission information is reliable information.

The information display apparatus 100 analyzes reliable information, and extracts an information acquisition time, an information update time, a location, a domain, and an event as an analysis result. The information display apparatus 100 analyzes transmission information, and extracts an information acquisition time, an information update time, a location, a domain, and an event as an analysis result. With this configuration, it is possible to determine whether or not the analysis result of the transmission information is similar to the analysis result of the reliable information.

Incidentally, the embodiment of the information display apparatus 100 described above is an example. For example, the information display apparatus 100 may communicate with a client and receive transmission information from the client. When the transmission information is received from the client, the information display apparatus 100 analyzes the transmission information. The information display apparatus 100 acquires reliable information corresponding to an analysis result similar to an analysis result of the transmission information, and causes the client to display a difference portion between the acquired reliable information and the transmission information together with the transmission information. With this configuration, it is possible to present information for determining reliability of the transmitted information with minimum functions of the client.

Figure 12:
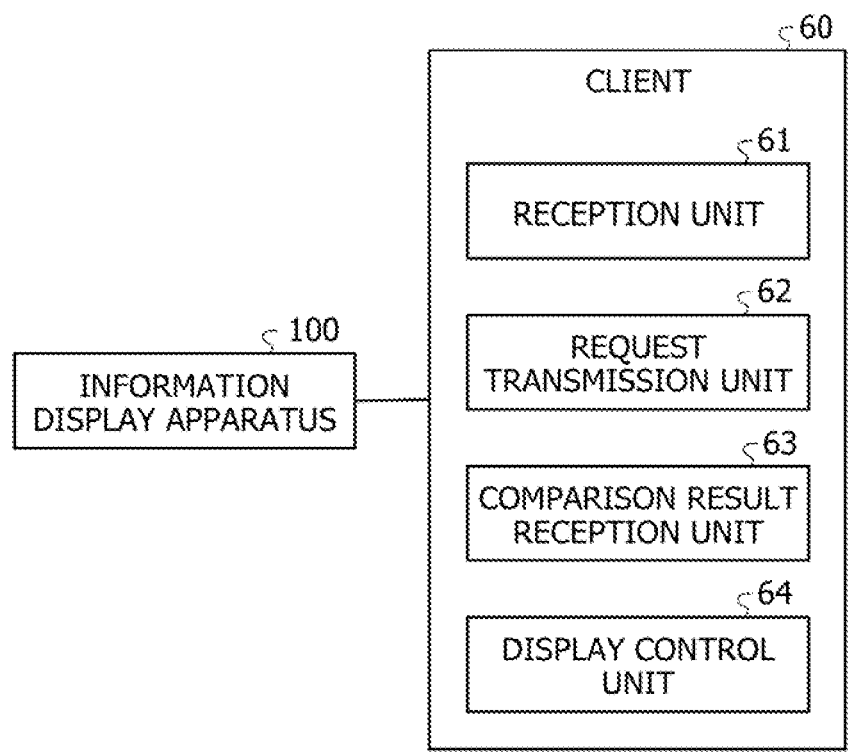
FIG. 12 is a diagram for describing another embodiment.

FIG. 12 is a diagram for describing another embodiment. As illustrated in FIG. 12, an information display apparatus 100 is coupled to a client 60. The client 60 includes a reception unit 61, a request transmission unit 62, a comparison result reception unit 63, and a display control unit 64.

The reception unit 61 receives transmission information transmitted through an SNS or the like, which is transmission information for determining reliability. The reception unit 61 outputs the transmission information to the request transmission unit 62.

The request transmission unit 62 transmits a request for transmission information to the information display apparatus 100.

The information display apparatus 100 executes transmission and reception of data to and from the client 60 via a communication unit 110. In the information display apparatus 100, when a request for transmission information is received from the client 60, a second analysis unit 155, a reliable information acquisition unit 156, and a comparison unit 157 execute the processing described above, and transmit a comparison result to the client 60.

The comparison result reception unit 63 outputs, when a comparison result is received from the information display apparatus 100, the comparison result to the display control unit 64.

The display control unit 64 executes processing corresponding to the display control unit 158 of the information display apparatus 100. For example, the display control unit 64 causes a display unit of the client to display transmission information and a difference portion in association with each other.

Figure 13:
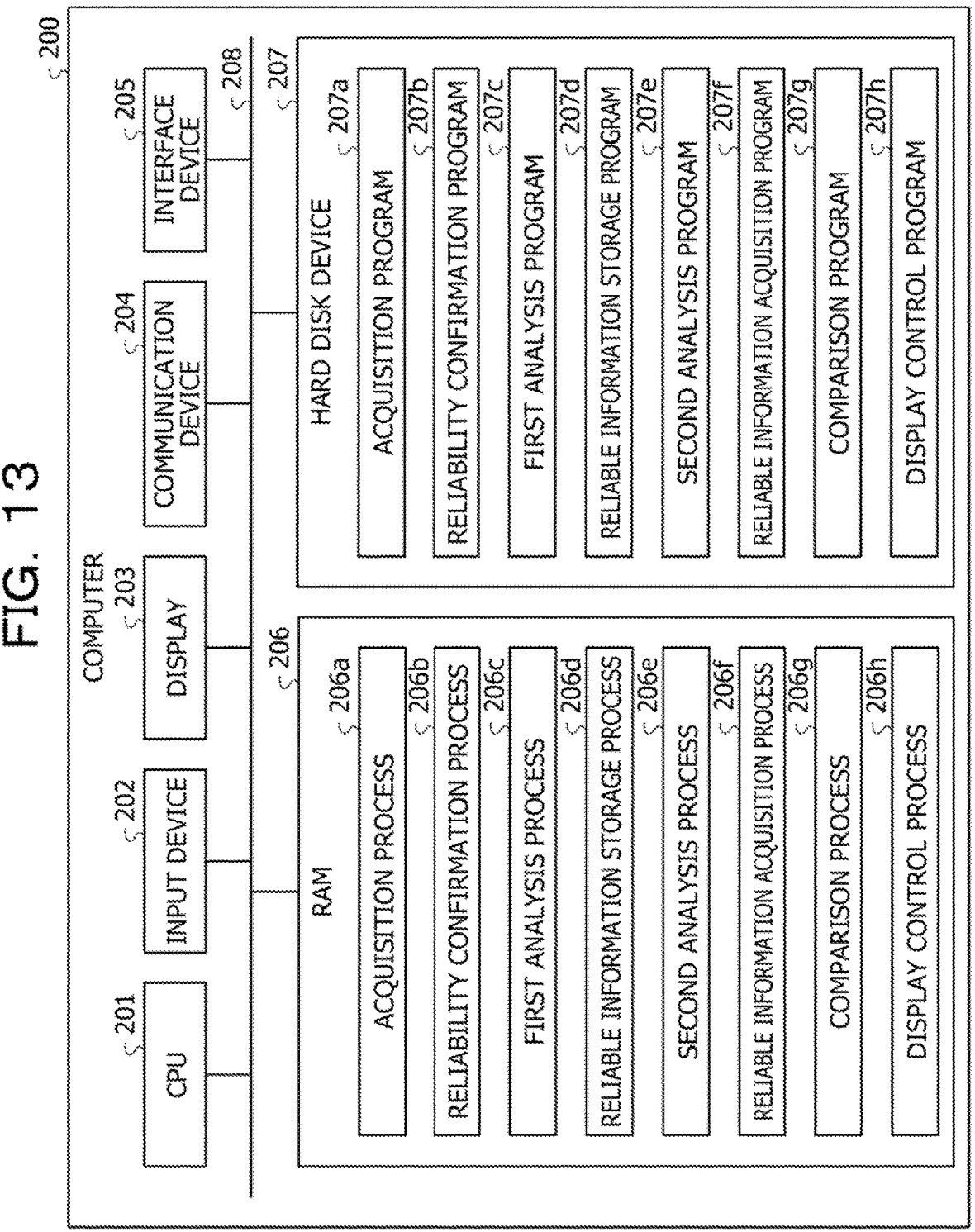
FIG. 13 is a diagram illustrating an example of a hardware configuration of a computer that implements functions similar to those of the information display apparatus of the embodiment.

Next, an example of a hardware configuration of a computer that implements functions similar to those of the information display apparatus 100 described above will be described. FIG. 13 is a diagram illustrating an example of the hardware configuration of the computer that implements the functions similar to those of the information display apparatus of the embodiment.

As illustrated in FIG. 13, a computer 200 includes a CPU 201 that executes various types of arithmetic processing, an input device 202 that receives data input from a user, and a display 203. Furthermore, the computer 200 includes a communication device 204 that exchanges data with an external device or the like via a wired or wireless network, and an interface device 205. Furthermore, the computer 200 includes a RAM 206 that temporarily stores various types of information, and a hard disk device 207. Additionally, each of the devices 201 to 207 is coupled to a bus 208.

The hard disk device 207 includes an acquisition program 207a, a reliability confirmation program 207b, a first analysis program 207c, and a reliable information storage program 207d. The hard disk device 207 includes a second analysis program 207e, a reliable information acquisition program 207f, a comparison program 207g, and a display control program 207h. Furthermore, the CPU 201 reads each of the programs 207a to 207h and develops the programs to the RAM 206.

The acquisition program 207a functions as an acquisition process 206a. The reliability confirmation program 207b functions as a reliability confirmation process 206b. The first analysis program 207c functions as a first analysis process 206c. The reliable information storage program 207d functions as a reliable information storage process 206d. The second analysis program 207e functions as a second analysis process 206e. The reliable information acquisition program 207f functions as a reliable information acquisition process 206f. The comparison program 207g functions as a comparison process 206g. The display control program 207h functions as a display control process 206h.

Processing of the acquisition process 206a corresponds to the processing of the acquisition unit 151. Processing of the reliability confirmation process 206b corresponds to the processing of the reliability confirmation unit 152. Processing of the first analysis process 206c corresponds to the processing of the first analysis unit 153. Processing of the reliable information storage process 206d corresponds to the processing of the reliable information storage unit 154. Processing of the second analysis process 206e corresponds to the processing of the second analysis unit 155. Processing of the reliable information acquisition process 206f corresponds to the processing of the reliable information acquisition unit 156. Processing of the comparison process 206g corresponds to the processing of the comparison unit 157. Processing of the display control process 206h corresponds to the processing of the display control unit 158.

Note that each of the programs 207a to 207h does not necessarily have to be stored in the hard disk device 207 from the beginning. For example, each of the programs is stored in a "portable physical medium" to be inserted into the computer 200, such as a flexible disk (FD), a compact disc read only memory (CD-ROM), a digital versatile disc (DVD), a magneto-optical disk, or an integrated circuit (IC) card. Then, the computer 200 may read and execute each of the programs 207a to 207h.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information display apparatus comprising:
a memory; and
a processor coupled to the memory, the processor being configured to perform processing including:
analyzing transmission information to extract first analysis information with respect to the transmission information, the first analysis information including a domain of the transmission information determined by comparing keywords extracted from the transmission information with a plurality of predefined associated keywords stored in a domain table, each set of associated keywords being associated with a respective domain;
acquiring, from among a plurality of pieces of second analysis information, second analysis information similar to the first analysis information, the plurality of pieces of second analysis information being obtained by analyzing a plurality of pieces of reliable information, each of the plurality of pieces of reliable information being information that has been confirmed in advance to have a content considered to be reliable;
comparing the first analysis information with the acquired second analysis information similar to the first analysis information; and
displaying a result of the comparison and the transmission information, wherein
the acquiring of the second analysis information includes
specifying, from among a plurality of search conditions stored in a search condition table, a search condition corresponding to the domain included in the first analysis information, the search condition table being a table configured to store, for each domain of a plurality of domain, at least one or more search conditions among the plurality of search conditions in association with the each domain, the plurality of search conditions including at least a time search condition and a location search condition, each of the plurality of search conditions being a respective condition to be compared to each of the plurality of pieces of second analysis information in determining whether the each of the plurality of pieces of second analysis information is satisfied with the respective condition, and
searching for, using the specified search condition, from among the plurality of pieces of second analysis information, at least one piece of second analysis information that is associated with the domain included in the first analysis information and that satisfies the specified search condition.

2. The information display apparatus according to claim 1, the processing further comprising:
acquiring, as the reliable information, information acquired from a location registered in advance and information to which a digital signature is added.

3. The information display apparatus according to claim 2, wherein the displaying includes displaying a difference portion between the first analysis information and the second analysis information similar to the first analysis information, and the transmission information.

4. The information display apparatus according to claim 1, wherein
the analyzing of the transmission information includes analyzing the transmission information to extract, as the first analysis information, a time when the transmission information is transmitted, a location included in a text of the transmission information, or an event included in the text included in the transmission information, or any combination of the time, the location, or the event, and
the acquiring includes extracting, as the second analysis information, a time when the reliable information is transmitted, a location included in a text of the reliable information, or an event included in the text, or any combination of the time, the location, or the event by analyzing the reliable information.

5. The information display apparatus according to claim 3, wherein
each second analysis information of the plurality of pieces of second analysis information includes at least a location and an event, both of the location and the event being extracted from at least any one of the plurality of pieces of reliable information, and the displaying includes displaying: the transmission information; and the location and the event included in the acquired second analysis information.

6. The information display apparatus according to claim 1, wherein the analyzing of the transmission information includes extracting first analysis information of transmission information by analyzing the transmission information received from a client, and transmitting, to the client, a comparison result between the first analysis information and second analysis information similar to the first analysis information.

7. An information display method implemented by a computer, the information display method comprising:

analyzing transmission information to extract first analysis information with respect to the transmission information, the first analysis information including a domain of the transmission information determined by comparing keywords extracted from the transmission information with a plurality of predefined associated keywords stored in a domain table, each set of associated keywords being associated with a respective domain;

acquiring, from among a plurality of pieces of second analysis information, second analysis information similar to the first analysis information, the plurality of pieces of second analysis information being obtained by analyzing a plurality of pieces of reliable information, each of the plurality of pieces of reliable information being information that has been confirmed in advance to have a content considered to be reliable;

comparing the first analysis information with the acquired second analysis information similar to the first analysis information; and displaying a result of the comparison and the transmission information, wherein the acquiring of the second analysis information includes specifying, from among a plurality of search conditions stored in a search condition table, a search condition corresponding to the domain included in the first analysis information, the search condition table being a table configured to store, for each domain of a plurality of domain, at least one or more search conditions among the plurality of search conditions in association with the each domain, the plurality of search conditions including at least a time search condition and a location search condition, and another search condition, each of the plurality of search conditions being a respective condition to be compared to each of the plurality of pieces of second analysis information in determining whether the each of the plurality of pieces of second analysis information is satisfied with the respective condition, and searching for, using the specified search condition, from among the plurality of pieces of second analysis information, at least one piece of second analysis information that is associated with the domain included in the first analysis information and that satisfies the specified search condition.

8. A non-transitory computer-readable recording medium storing an information display program for causing a computer to perform processing including:

analyzing transmission information to extract first analysis information with respect to the transmission information, the first analysis information including a domain of the transmission information determined by comparing keywords extracted from the transmission information with a plurality of predefined associated keywords stored in a domain table, each set of associated keywords being associated with a respective domain;

acquiring, from among a plurality of pieces of second analysis information, second analysis information similar to the first analysis information, the plurality of pieces of second analysis information being obtained by analyzing a plurality of pieces of reliable information, each of the plurality of pieces of reliable information being information that has been confirmed in advance to have a content considered to be reliable;

comparing the first analysis information with the acquired second analysis information similar to the first analysis information; and displaying a result of the comparison and the transmission information, wherein the acquiring of the second analysis information includes specifying, from among a plurality of search conditions stored in a search condition table, a search condition corresponding to the domain included in the first analysis information, the search condition table being a table configured to store, for each domain of a plurality of domain, at least one or more search conditions among the plurality of search conditions in association with the each domain, the plurality of search conditions including a time search condition, a location search condition, and another search condition, each of the plurality of search conditions being a respective condition to be compared to each of the plurality of pieces of second analysis information in determining whether the each of the plurality of pieces of second analysis information is satisfied with the respective condition, and searching for, using the specified search condition, from among the plurality of pieces of second analysis information, at least one piece of second analysis information that is associated with the domain included in the first analysis information and that satisfies the specified search condition.

\* \* \* \* \*